(12) United States Patent
Meheen

(10) Patent No.: US 9,617,750 B1
(45) Date of Patent: Apr. 11, 2017

(54) CORRUGATED METAL SHEETS AND CONCRETE MODULAR BUILDING STRUCTURE

(71) Applicant: H. Joe Meheen, Denver, CO (US)

(72) Inventor: H. Joe Meheen, Denver, CO (US)

( * ) Notice: Subject to any disclaimer, the term of this patent is extended or adjusted under 35 U.S.C. 154(b) by 0 days.

(21) Appl. No.: 14/839,629

(22) Filed: Aug. 28, 2015

(51) Int. Cl.

| | |
|---|---|
| E04H 9/02 | (2006.01) |
| E04B 1/98 | (2006.01) |
| E04B 2/54 | (2006.01) |
| E04H 1/00 | (2006.01) |
| E04H 9/14 | (2006.01) |
| E04H 9/16 | (2006.01) |
| E04B 1/94 | (2006.01) |
| E04B 2/86 | (2006.01) |
| E04D 13/03 | (2006.01) |
| E04C 2/52 | (2006.01) |
| E04B 1/32 | (2006.01) |
| E04C 2/34 | (2006.01) |
| E04B 2/00 | (2006.01) |
| E04B 5/02 | (2006.01) |
| E04C 2/26 | (2006.01) |
| H02S 20/23 | (2014.01) |

(52) U.S. Cl.
CPC ............ *E04H 9/028* (2013.01); *E04B 1/32* (2013.01); *E04B 1/941* (2013.01); *E04B 1/945* (2013.01); *E04B 1/98* (2013.01); *E04B 2/54* (2013.01); *E04B 2/86* (2013.01); *E04C 2/26* (2013.01); *E04C 2/34* (2013.01); *E04C 2/46* (2013.01); *E04C 2/50* (2013.01); *E04C 2/521* (2013.01); *E04D 13/03* (2013.01); *E04H 1/005* (2013.01); *E04H 9/021* (2013.01); *E04H 9/024* (2013.01); *E04H 9/025* (2013.01); *E04H 9/14* (2013.01); *E04H 9/16* (2013.01); *H02S 20/23* (2014.12); *E04C 2002/3444* (2013.01)

(58) Field of Classification Search
CPC E04H 9/028; E04H 9/021; E04H 9/16; E04H 9/025; E04H 9/14; E04H 9/024; E04H 1/005; E04C 2/26; E04C 2/46; E04C 2/521; E04C 2/50; E04C 2/34; E04C 2002/3444; E04B 2/54; E04B 2/86; E04B 1/941; E04B 1/98; E04B 1/945; E04B 1/32; E04D 13/03; H02S 20/23
USPC .......................................................... 52/79.1
See application file for complete search history.

(56) References Cited

U.S. PATENT DOCUMENTS

| | | | | |
|---|---|---|---|---|
| 1,652,703 | A | * 12/1927 | Cushman | ................ E01F 5/005 |
| | | | | 118/DIG. 10 |
| 1,895,553 | A | * 1/1933 | Nordell | ................ E06B 3/7001 |
| | | | | 52/783.12 |

(Continued)

*Primary Examiner* — Brent W Herring
(74) *Attorney, Agent, or Firm* — Edwin H. Crabtree; Ramon L. Pizarro

(57) ABSTRACT

A modular building structure having a plurality of panels made of corrugated metal sheets. The metal sheets are formed into an annular, tubular shape, such as a round shape, an oval shape, an elliptical shape and the like. A lower portion of the annular shaped metal sheets is buried below a ground surface, thus forming a foundation for the structure. The metal sheets are filled with concrete therebetween to create a fire proof, wind proof and earthquake resistant structure. The building structure can include exterior walls, interior columns, a floor, and skylights for creating a living environment. Also, this type of building structure can have a compacted sand foundation which is immune to earthquakes.

14 Claims, 3 Drawing Sheets

(56) References Cited

U.S. PATENT DOCUMENTS

| | | | | |
|---|---|---|---|---|
| 1,970,670 | A * | 8/1934 | Nixon | E01F 5/005 138/109 |
| 2,202,743 | A * | 5/1940 | Miller | E01F 5/005 138/170 |
| 2,815,656 | A * | 12/1957 | Klein | E01F 8/0023 52/169.1 |
| 3,308,596 | A * | 3/1967 | Cooper | E04C 2/32 52/264 |
| 3,438,211 | A * | 4/1969 | Neeff | E21D 11/15 405/152 |
| 3,508,406 | A * | 4/1970 | Fisher | E01D 1/00 138/105 |
| 4,141,666 | A * | 2/1979 | DeGraff | E03F 5/00 405/126 |
| 4,186,541 | A * | 2/1980 | Sivachenko | E01D 19/02 52/630 |
| 4,318,635 | A * | 3/1982 | Gurtner | E01F 5/005 405/126 |
| 4,534,144 | A * | 8/1985 | Gustafsson | E04H 9/12 52/167.1 |
| 4,563,107 | A * | 1/1986 | Peterson | E01D 4/00 405/124 |
| 4,605,338 | A * | 8/1986 | Peterson | E01F 5/005 138/105 |
| 4,653,238 | A * | 3/1987 | Berman | E04B 1/18 52/236.2 |
| 4,653,239 | A * | 3/1987 | Randa | E04B 1/35 52/220.2 |
| 5,326,191 | A * | 7/1994 | Wilson | E01F 5/005 285/903 |
| 5,833,394 | A * | 11/1998 | McCavour | E02D 29/045 405/126 |
| 6,050,746 | A * | 4/2000 | McCavour | E01F 5/005 405/124 |
| 6,061,976 | A * | 5/2000 | Willbanks, Jr. | E04H 9/12 52/169.1 |
| 6,385,922 | B1 * | 5/2002 | Mors | E04D 13/03 52/173.3 |
| 6,474,907 | B2 * | 11/2002 | Semotiuk | E01F 5/005 403/338 |
| 6,595,722 | B2 * | 7/2003 | McCavour | E02D 29/045 405/126 |
| 6,959,519 | B2 * | 11/2005 | Adriaansen | A01G 9/1438 52/18 |
| 8,157,475 | B2 * | 4/2012 | Kim | E02D 29/045 405/49 |
| 8,220,220 | B2 * | 7/2012 | Kim | E04G 23/0218 52/742.14 |
| 8,365,483 | B2 * | 2/2013 | Hijazi | E04B 1/3205 52/245 |
| 8,465,226 | B2 * | 6/2013 | Davis | E01F 5/005 405/125 |
| 8,925,285 | B2 * | 1/2015 | Brewerton | E02D 5/04 52/783.13 |
| D733,924 | S * | 7/2015 | Hubbard | D25/33 |
| 9,163,392 | B2 * | 10/2015 | Wilson | E01F 5/005 |
| 2003/0009954 | A1 * | 1/2003 | Bradley | E04H 1/1205 52/79.1 |
| 2009/0214297 | A1 * | 8/2009 | Wilson | E01F 5/005 405/124 |
| 2010/0146789 | A1 * | 6/2010 | Anderson | B21D 5/14 29/897.32 |
| 2010/0281784 | A1 * | 11/2010 | Leo | E04B 1/0023 52/16 |
| 2011/0067321 | A1 * | 3/2011 | Hijazi | E04B 1/3205 52/79.1 |
| 2011/0232203 | A1 * | 9/2011 | Anderson | B21D 5/08 52/86 |
| 2013/0042568 | A1 * | 2/2013 | Davis | E04B 1/24 52/634 |
| 2013/0227896 | A1 * | 9/2013 | Anderson | B21D 5/08 52/86 |
| 2013/0263529 | A1 * | 10/2013 | Wilson | E01F 5/005 52/86 |
| 2013/0340370 | A1 * | 12/2013 | Brewerton | E02D 5/04 52/515 |
| 2014/0174009 | A1 * | 6/2014 | Williams | B62D 63/00 52/220.1 |
| 2014/0298745 | A1 * | 10/2014 | Rechenmacher | E04B 1/161 52/425 |

* cited by examiner

CORRUGATED METAL SHEETS AND CONCRETE MODULAR BUILDING STRUCTURE

BACKGROUND OF THE INVENTION (a) Field of the Invention

This invention relates to a modular building structure and more particularly, but not by way of limitation, to a low cost modular building structure using corrugated, light gauge, metal sheets filled with concrete for creating a fire proof, a wind proof and an earthquake resistant building. The building structure can be used as a home, a garage, an office and the like.

(b) Discussion of Prior Art

Heretofore, there have been a number of different types of low cost building structures built and used as temporary homes after different types of environmental disasters, such as forest fires, tornadoes, hurricanes and earthquakes. These prior art structures are not designed to be permanent buildings nor are they designed to withstand future disasters caused by mother nature when compared to the subject invention as described herein.

SUMMARY OF THE INVENTION

In view of the foregoing, it is a primary objective of the subject invention to provide a permanent building structure that is easy to construct and install, and is designed to withstand forest fires, high winds, tornadoes, hurricanes, earthquakes and other natural disasters.

Another object of the invention is the structure is low cost and is economical in erection, in heating, in cooling and in maintaining. Also, the structure is modular in nature and can be easily added to an existing structure or used as a stand-alone structure.

Still another object of the invention is the building structure can be used as a home or office with various floor plans, used as a garage, used as a maintenance or equipment building and other building applications.

The subject invention includes a modular building structure having a plurality of panels made of corrugated metal sheets. The metal sheets are formed into an annular shape, such as a round shape, an oval shape, an elliptical shape. A lower portion of the annular shaped metal sheets is buried below a ground surface, thus forming a foundation of the structure. After erection, the metal sheets are filled with concrete to create a fire proof, wind proof and earthquake resistant structure. The building structure can also includes exterior and interior walls, a floor, skylights, solar panels, and other additions for creating a living environment.

These and other objects of the present invention will become apparent to those familiar with the modular building construction when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject building structure, and in which.

DETAILED DESCRIPTION OF THE PREFERRED EMBODIMENTS

Figure 1:
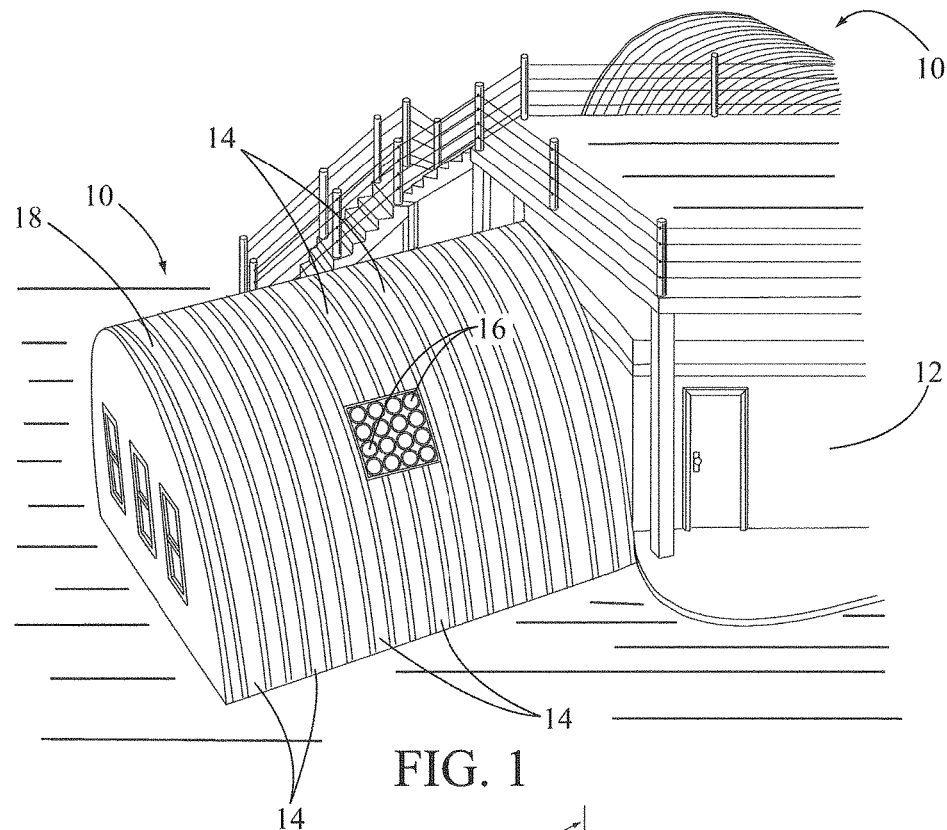
FIG. 1 is a perspective view of the subject sheet metal and concrete modular building structure and attached to one side of an existing building.

In FIG. 1, a perspective view of the subject sheet metal and concrete modular building structure is shown having general reference numeral 10. The building has a annular, tubular structure and is shown having one end attached to a conventional existing building 12. Obviously, the modular, tubular structure 10 can be used as a home, an office, a garage, a car port, an equipment room and the like and can be part of the structure 10. The concrete can be a mixture of cement and fly ash to reduce material costs.

Figure 3:
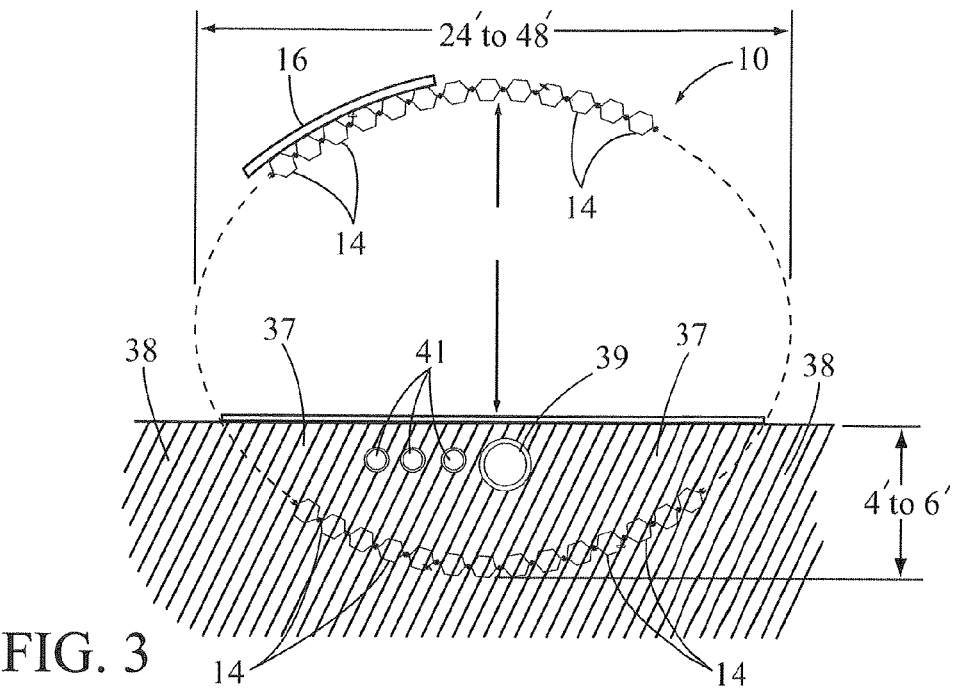
FIG. 3 is a front sectional view of an oval shaped building structure with a lower portion of the structure buried below a ground surface.

In FIG. 3, a front sectional view of an oval shaped building structure 10 is shown with a lower portion of the structure having fill dirt 37 and buried below a ground surface 38. Typically, the structure 10 is formed first into a desired geometric shape. Then, the lower portion of the structure is buried below the ground surface 38, with 4 to 6 feet of the fill dirt 37 compacted on top of the lower portion, thus forming a building foundation. Also, a sewer line 39 and electrical, gas and plumbing lines 41 are shown and buried in fill dirt foundation.

Then the top portion and the bottom portion of the structure 10 are pumped with concrete 36 between the corrugated metal sheets 14. Once the structure is complete, end walls 20, interior walls, a floor surface, a ceiling, plumbing and electrical appliances can be added. The width and length of the structure can be 24 to 48 feet and greater.

Figure 4:
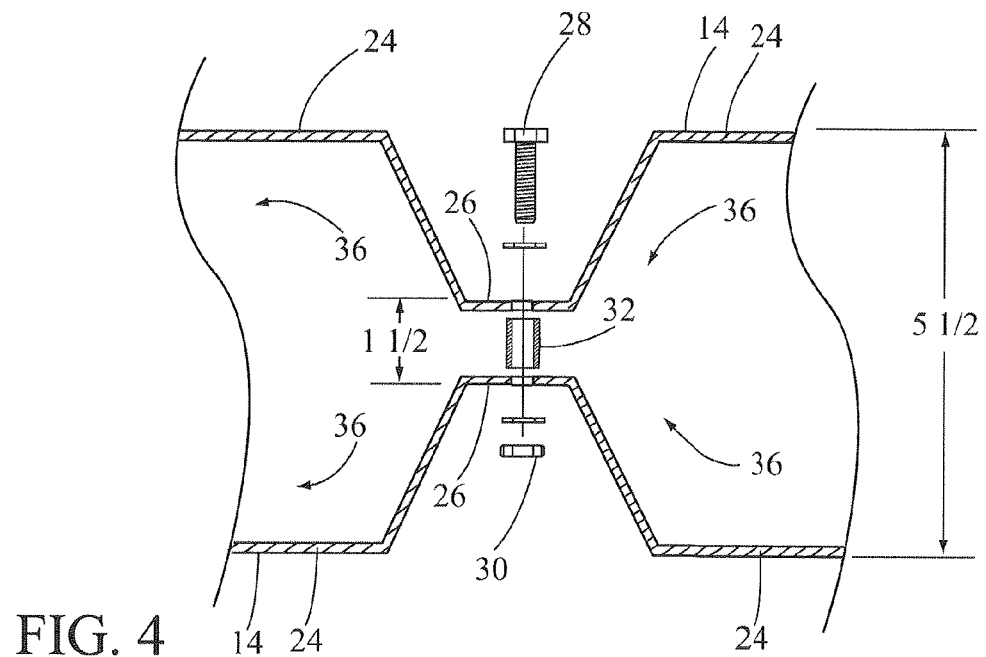
FIG. 4 is an enlarged front view of two mating corrugated sheets attached to each other with a spacer mounted between the metal sheets.

In FIG. 4, an enlarged front view of two mating corrugated sheets 14 are shown and attached to each other with the spacer 32 mounted between the valleys 26 of the metal sheets. In this drawing, concrete 36 is shown being received between the sheets 14. The space between the valleys 26 is typically 1½ inches. The overall width of the structure 10 is approximately 5½ inches.

Figure 5:
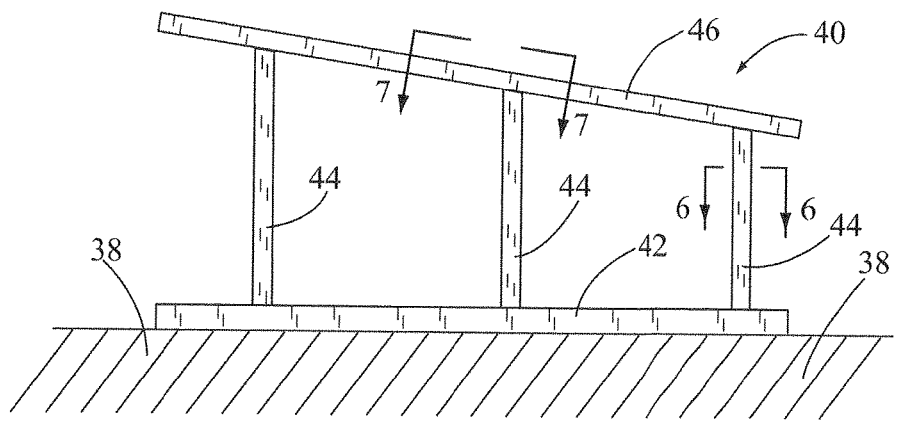
FIG. 5 is an alternate embodiment of the invention and illustrating a side view of an angular building structure

In FIG. 5, an alternate embodiment of the invention is shown illustrating a side view of an angular building structure having general reference numeral 40. The building structure 40 is shown with a concrete floor 42 on top of the ground surface 38, with vertical columns 44, and a sloped roof 46. Also, the floor can be made of compacted dirt. The floor 42, columns 44 and roof 46 are made of extruded, light gauge, metal sheets, building 12 or can be built independently of the building. Also shown in this drawing is another building structure 10 extending outwardly from a rear of the building 12.

Figure 2:
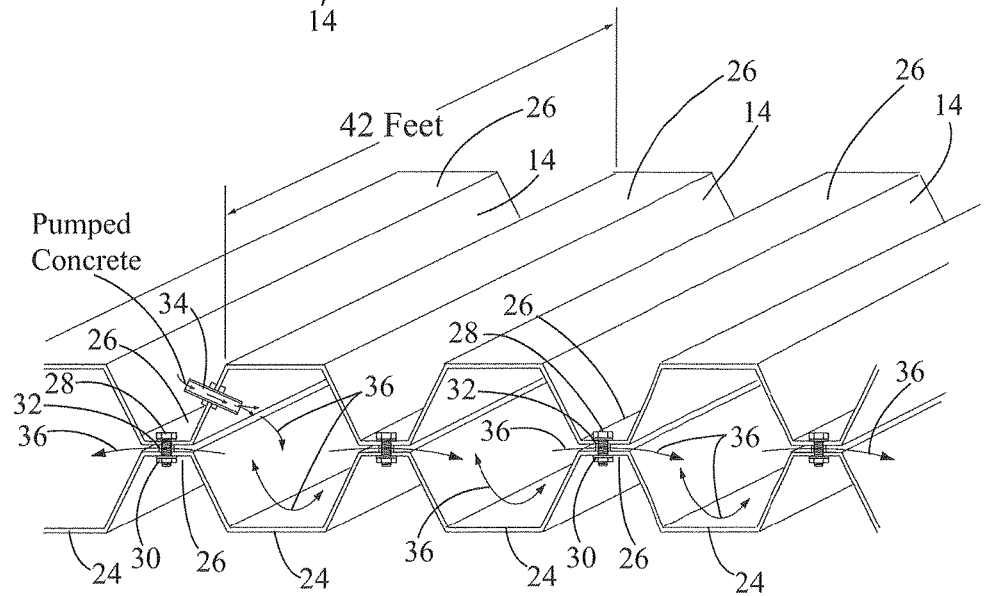
FIG. 2 is an enlarged perspective view of two mating sheets of corrugated sheet metal joined together for receiving pumped concrete therebetween.

The building structure 10 is made up of a plurality of corrugated, light gauge, metal sheets 14, joined together as shown in FIGS. 2 and 4, with concrete received between the sheets. The metal sheets 14 are typically 3 feet in width and up to 42 feet in length and bent to form various geometric tubular shapes, as shown in FIG. 3. For example, a cross section of the structure can be oval, circular, elliptical and the like. The annular shapes provide for having a lower portion of the structure buried below a ground surface to form a firm foundation for the building. An upper portion of the structure provides a living space with a roof, which easily resists wind uplift and provides for rain and snow runoff. Because of the weight of the concrete received between the metal sheets, the heavy weighted structure withstands high winds, hurricanes, tornadoes, and earthquakes. In this drawing, a skylight 16 had been added to the annular shaped roof 18 and an end wall 20 includes windows 22 for providing natural light therein. As mentioned above, the building structure 10 can be an independent, standalone, building with end walls 20 on opposite ends of the structure.

In FIG. 2, an enlarged perspective view of two mating sheets of corrugated metal sheets 14 is shown. An upper metal sheet 14 and a lower metal sheet include hills 24 and valleys 26 formed along a length of the sheets. The valleys 26 of the sheets are used to attach the upper sheet to the lower sheet using bolts 28 and nuts 30 with tubular spacers 32 disposed between the two valleys. In this view, a portion of an upper sheet 14 includes a concrete valve 34 for receiving pumped concrete under pressure, indicated by arrows 36, inside the two joined metal sheets 14 and throughout the annular shaped similar to the corrugated metal sheets 14, and formed with various geometric cross sections, as shown in FIGS. 6 and 7.

Figure 6:
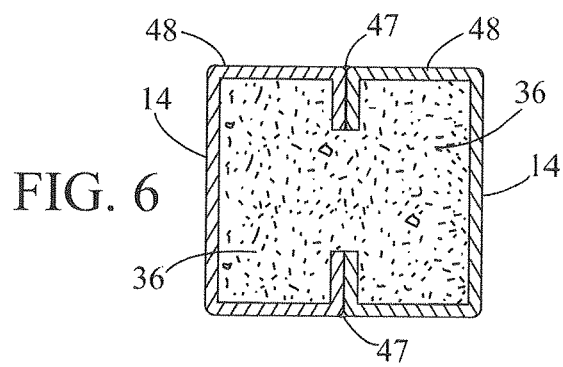
FIG. 6 is a sectional view of a vertical column, shown in lines 6-6 in FIG. 5.

In FIG. 6, a sectional view of the vertical column 44 is illustrated and taken along lines 6-6, as shown in FIG. 5. In this view, a pair of "C" shaped metal sheets 48 are shown welded together with a 1/16 inch bead weld 47.

Figure 7:
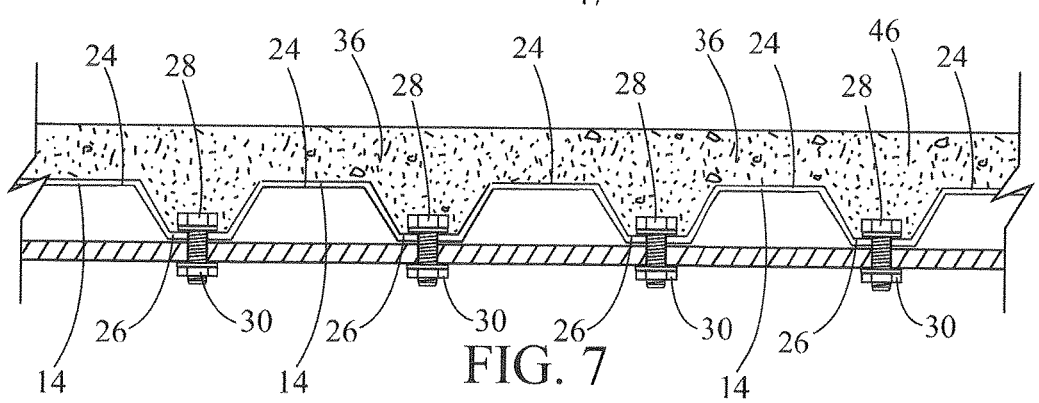
FIG. 7 is a sectional view of a portion of a roof, shown in lines 7-7 in FIG. 5.

In FIG. 7, a sectional view of a portion of the roof 46 is illustrated and taken along lines 7-7, as shown in FIG. 5. In this view, one of the corrugated metal sheets 14 is used with the valleys 26 attached to a top of a ceiling metal sheet 50 using the bolts 28 and nuts 30. Also, concrete 36 is then poured on top of the metal sheet 14, thus forming a heavy fire resistant, wind resistant roof.

From viewing the above description of the drawings, it can be appreciated that through the use of metal sheets and concrete, a low cost, annular modular building structure 10 or angular building structure 40 can be built, which can be easily constructed for permanent use as a building that is resistant to earthquakes, forest fires, tornadoes, hurricanes and other natural disasters. Also, the structures 10 and 40 can include windows, exterior and interior walls with doors, skylights, solar panels and other building enhancements. Further, other versions of annular and angular structures can be erected using light gauge metals sheets filled with concrete and supported on a 5 inch concrete floor or compacted dirt and sand.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A fire resistant, wind resistant, and earthquake resistant modular building structure, the building structure formed into a tubular, annular shape, the building structure comprising:
   a plurality of upper corrugated metal sheets having hills and valleys formed along a length thereof;
   a plurality of lower corrugated metal sheets having hills and valleys formed along a length thereof, the valleys of the upper sheets are attached to the valleys of the lower sheets and with a spacer, the spacer disposed between adjacently positioned valleys of the upper and lower sheets, the upper sheets attached to the lower sheets to form a continuous structural cross section with an upper portion and a lower portion the continuous structural cross section being an oval cross section, or a circular cross section or an elliptical cross section;
   concrete received between the upper and lower corrugated metal sheets; and
   fill dirt, the fill dirt received on top of the lower portion of the upper and lower corrugated metal sheets making up the building structure, the lower portion of the metal sheets buried below a ground surface.

2. The building structure as described in claim 1 wherein the upper and lower corrugated sheets include bolts received through the valleys of the sheets and attached to nuts.

3. The building structure as described in claim 1 wherein one end of the upper and lower corrugated metal sheets is attached to a vertical end wall.

4. The building structure as described in claim 3 wherein the end wall includes at least one window.

5. The building structure as described in claim 1 wherein an upper portion of the upper and lower corrugated metal sheets includes a skylight received therethrough.

6. The building structure as described in claim 1 further including exterior walls, interior columns, a floor, plumbing, electrical appliances for creating a living environment.

7. The building structure as described in claim 1 further including solar panels for mounting on a roof of the structure.

8. A fire resistant, wind resistant, and earthquake resistant modular building structure, the building structure formed into a tubular, annular shape, the building structure comprising:
   a plurality of upper corrugated metal sheets having hills and valleys formed along a length thereof;
   a plurality of lower corrugated metal sheets having hills and valleys formed along a length thereof, the valleys of the upper sheets are attached to the valleys of the lower sheets and with a spacer, the spacer disposed between adjacently positioned valleys of the upper and lower sheets, the upper sheets attached to the lower sheets to form a continuous structural cross section with an upper portion and a lower portion the continuous structural cross section being an oval cross section, or a circular cross section, or an elliptical cross section;
   concrete received between the upper and lower corrugated metal sheets; and
   fill dirt, the fill dirt received on top of the lower portion of the upper and lower corrugated metal sheets making up the building structure, the lower portion of the metal sheets buried with the fill dirt in a range of 4 to 6 feet below a ground surface, thus forming a building foundation.

9. The building structure as described in claim 8 wherein the upper and lower corrugated sheets include bolts received through the valleys of the sheets and attached to nuts.

10. The building structure as described in claim 8 wherein one end of the upper and lower corrugated metal sheets is attached to a vertical end wall.

11. The building structure as described in claim 10 wherein the end wall includes at least one window.

12. The building structure as described in claim 8 wherein an upper portion of the upper and lower corrugated metal sheets includes a skylight received therethrough.

13. The building structure as described in claim 8 further including exterior walls, interior columns, a floor, plumbing, electrical appliances for creating a living environment.

14. The building structure as described in claim 8 further including solar panels for mounting on a roof of the structure.

\* \* \* \* \*